(12) United States Patent
Faoucher et al.

(10) Patent No.: US 9,958,128 B2
(45) Date of Patent: May 1, 2018

(54) LIGHT ASSEMBLY FOR THE LIGHTING AND/OR THE SIGNALING OF A MOTOR VEHICLE

(71) Applicant: VALEO VISION, Bobigny (FR)

(72) Inventors: Erwan Faoucher, Bobigny (FR); Francois Gratecap, Bobigny (FR)

(73) Assignee: VALEO VISION, Bobigny (FR)

( * ) Notice: Subject to any disclaimer, the term of this patent is extended or adjusted under 35 U.S.C. 154(b) by 0 days. days.

(21) Appl. No.: 15/435,795

(22) Filed: Feb. 17, 2017

(65) Prior Publication Data

US 2017/0241613 A1  Aug. 24, 2017

(30) Foreign Application Priority Data

Feb. 18, 2016  (FR) ..................... 16 51304

(51) Int. Cl.
*H05B 37/02* (2006.01)
*F21S 8/10* (2006.01)
*B60Q 1/00* (2006.01)
*B60R 13/00* (2006.01)
*B23K 26/36* (2014.01)
*G09F 13/04* (2006.01)

(52) U.S. Cl.
CPC ........ *F21S 48/2212* (2013.01); *B60Q 1/0041* (2013.01); *B60R 13/005* (2013.01); *F21S 48/125* (2013.01); *F21S 48/14* (2013.01); *F21S 48/15* (2013.01); *F21S 48/238* (2013.01); *F21S 48/25* (2013.01); *H05B 37/0227* (2013.01); *B23K 26/36* (2013.01); *B60Q 2400/40* (2013.01); *F21S 48/24* (2013.01); *F21S 48/31* (2013.01); *G09F 2013/044* (2013.01)

(58) Field of Classification Search
CPC .... F21S 48/2212; F21S 48/31; B60Q 1/0041; B60Q 2400/40; B60R 13/005; H05B 37/0227; G09F 13/044
USPC ............................ 315/77–82, 291, 307, 308
See application file for complete search history.

(56) References Cited

U.S. PATENT DOCUMENTS 8,235,547 B2 *  8/2012  Hofmann ................. F21K 9/00
                                                      362/235
9,741,273 B1 *  8/2017  Curtis ................... F21V 23/023

* cited by examiner

*Primary Examiner* — Jimmy Vu
(74) *Attorney, Agent, or Firm* — Oblon, McClelland, Maier & Neustadt, L.L.P.

(57) ABSTRACT

The subject matter of the invention is a light assembly which comprises means for emitting and means for focusing one or more light beams for the lighting or the signaling of a vehicle. It also comprises a mask which extends below the focusing means. This mask has at least a first surface that can be seen by any person passing close to the vehicle and at least a second surface opposite the first surface.

The mask is made from a dark diffusing material and a reflective material coating is deposited on part of the second surface while leaving a portion of this second surface free of reflective coating. Additional light-emitting means are placed opposite the second surface, such that the light rays emitted by the additional light-emitting means can pass through the mask via the portion free of reflective coating.

10 Claims, 1 Drawing Sheet

LIGHT ASSEMBLY FOR THE LIGHTING AND/OR THE SIGNALING OF A MOTOR VEHICLE

BACKGROUND OF THE INVENTION

Field of the Invention

The present invention relates to the devices used by the manufacturers of motor vehicles in order to customize the latter such as to make them easily distinguishable from those of the competition for any person located close to these vehicles. The style and the general shape of a vehicle generally comprise elements allowing the user to recognize a specific model or a specific manufacturer. The invention relates more particularly to the means allowing this customization through light assemblies for the lightning and/or the signaling of these vehicles.

Description of the Related Art

Among the known means for customization of a motor vehicle by the manufacturer thereof, the presentation of a visual element characteristic of this manufacturer is the most used: a logo or a badge of the manufacturer or of the model of the vehicle is generally placed at locations of said vehicle that can be easily seen, most frequently at the front and at the rear of the vehicle, on the corresponding bonnets and doors, in order to be seen from the exterior, or at the center of the steering wheel, in order to be seen from inside the vehicle. It should be noted that if the visual elements placed at these various points can differ on a same vehicle (for example: the manufacturer badge at the front, and the model badge at the rear), they have in common the fact of allowing any person passing close to the vehicle to identify at first glance the model or the manufacturer thereof, regardless of whether this vehicle is running or not.

Moreover, in order to take into account the growing requirement for interactivity by the users, some manufacturers propose "welcome scenarios", i.e. operation sequences automatically carried out by the vehicle when the user thereof arrives close to said vehicle or starts it. These can be, by way of non-exhaustive examples, the automatic unlocking of the doors, the automatic adjustment of the position of seats as a function of parameters pre-recorded by the user, or specific voice messages pre-recorded and customized by the user.

The subject matter of the invention is a device combining the two points set out above, and relates, more precisely, to a light assembly for lighting and/or for signaling of a vehicle, which, through a welcome operation sequence for said vehicle, customizes it via the presentation of a visual sign characteristic of the manufacturer thereof or of the model thereof.

It is known, for example from the document EP2340188, to incorporate a backlit badge into an element of the passenger compartment of the vehicle. In the device described by this document, a window is arranged in the closing cover for a driver airbag placed in the steering wheel, which window has the general shape of a badge or of a logo of the manufacturer of said vehicle. The logo or badge is attached to a surface placed at the rear of the closing cover for the airbag such as to block the aforementioned window, and an electroluminescent surface is placed at the rear of the surface bearing the logo or the badge of the manufacturer, such that, once said electroluminescent surface is electrically powered, this logo or badge appears to be backlit in the eyes of the driver placed facing the cover of the airbag.

Such a device requires the production of several separate elements of complex shapes: a surface bearing the logo or the badge (with consideration of possible colored elements), an electroluminescent surface, a device for powering the electroluminescent surface, wherein each of these elements should further include means engaging at least one of the other elements in order to allow said elements to be assembled and be held together. Such a device furthermore requires an assembly stage which can become complex depending on the complexity of the logo or of the badge in question. Finally, such a device, as a result of the design thereof, is intended rather for visual elements located inside the passenger compartment of the vehicle, which are protected from the exterior.

BRIEF SUMMARY OF THE INVENTION

The aim of the present invention is to propose a device for presenting a visual element characteristic of the manufacturer which is more simple, less costly, which can be used for a lighting and/or signaling module of the vehicle, and which does not require a complex assembly stage.

To this end, the subject matter of the invention is a light assembly for the lighting and/or the signaling of a motor vehicle, which comprises at least one light module housing means for emitting light rays in the direction of the output of said module, and particularly in the direction of focusing means, of lens type for example. The assembly also includes a mask, part of which extends below the light module and said focusing means, having at least a first surface that can be seen by any person passing close to the vehicle and at least a second surface opposite said first surface. According to the invention, the mask is made from a dark, particularly black, diffusing material, and a reflective material coating is deposited on part of the second surface while leaving a portion of this second surface free of coating. Light-emitting additional means are placed opposite said second surface, such that the light rays emitted by said additional means can pass through the mask via said portion free of coating.

Advantageously, the shape of this portion free of reflective material coating defines, at the surface of the mask that can be seen by any person passing close to the vehicle, the shape of a visual sign characteristic of the manufacturer or of the model of the vehicle: for example, in a nonlimiting manner, a logo or a badge.

Advantageously, this portion free of coating is arranged in an area of the mask that is separate from the area for possible focusing, on said mask, via said focusing means of the light module for the lighting or the signaling according to the invention, of rays emitted by the sun which would follow an opposite path to that of a beam emitted by said light module.

According to various embodiments, the invention also has one or more of the following features, taken individually or in combination:

the reflective material deposited on the second face of the mask is a metal thin layer;

the mask is produced from a polymer material from the family of polycarbonates or polyethersulfones to which suitable additives give a "diffusing black" appearance;

a transparent element, which can particularly be colored, is attached, for example by sticking, to the second surface of the mask, at the portion free of reflective coating;

the light-emitting additional means are separate from the light sources used for the lightning or the signaling of the vehicle;

control means are associated with said light-emitting additional means such that they are controlled independently of the light sources of the lighting and/or signaling lamps of the vehicle;

the light assembly includes means for detecting the presence of the driver close to the vehicle, and these means for controlling said additional means acting according to a set of predefined parameters when detection information is received.

BRIEF DESCRIPTION OF THE SEVERAL VIEWS OF THE DRAWINGS

Other features and advantages of the invention will emerge from the following description, illustrated by the following figures.

DETAILED DESCRIPTION OF THE INVENTION

Figure 1:
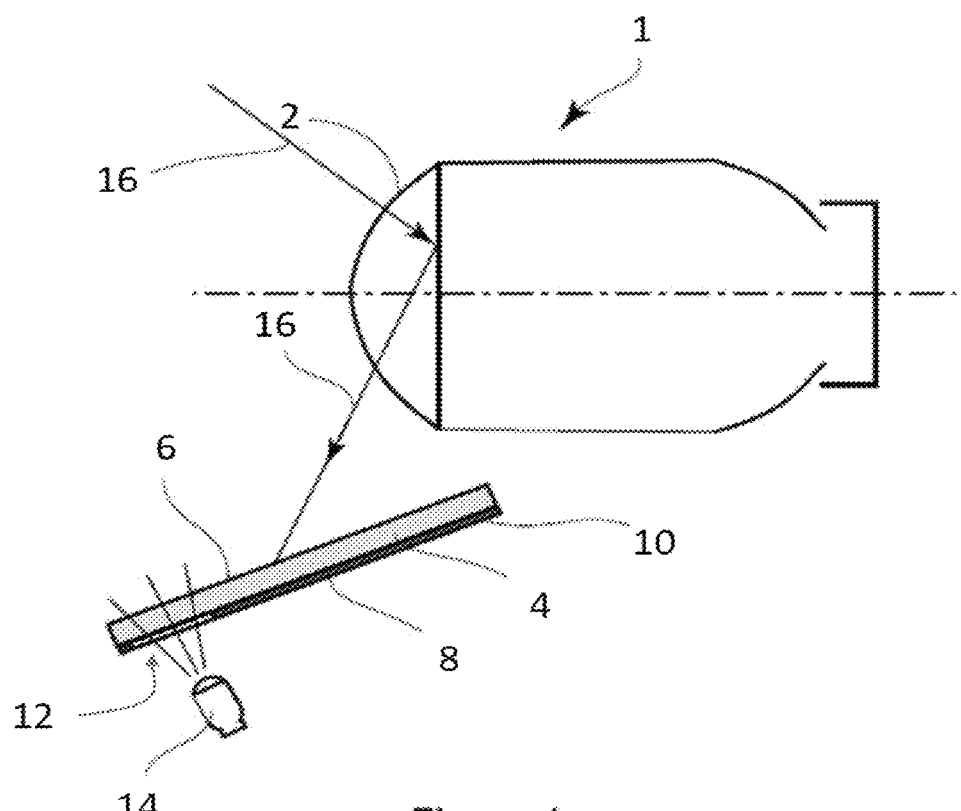
FIG. 1, which is a side schematic view of a light assembly according to the invention, with a mask part extending under a light module.

Referring to FIG. 1, an assembly for the lighting and/or the signaling of a motor vehicle includes at least one light module 1 which includes, in particular, one or more light-emitting sources (not shown), means for optical deflection of the light rays, emitted by these sources, in the direction of focusing means 2. Commonly, said focusing means 2 can consist of a lens, but the invention is used regardless of the focusing means selected and regardless of the number of emitting sources which is defined for the lighting or the signaling of the vehicle.

Figure 2:
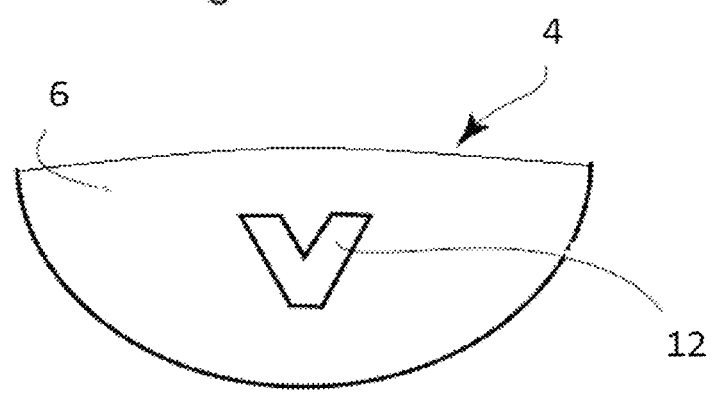
FIG. 2 which is a front schematic view of the part of the mask of FIG. 1, when the light-emitting additional means are active.

The assembly for the lighting and/or the signaling of a motor vehicle according to the invention also includes a mask 4, schematically partially shown in section in FIG. 1, below said focusing means 2, and part of which is schematically shown as a front view in FIG. 2.

This mask 4 gives the lighting and/or signaling assembly some of the aesthetics thereof as seen by any person passing close to said vehicle, particularly by concealing some elements of the light module, such as elements for fixing the light-emitting source or sources, or elements for fixing the focusing means 2, for example. With a complex shape, the mask 4 is, most often, produced by injection of a plastic material into a suitable mold, and it includes at least one part which extends under the focusing means 2: it is more specifically this part of the mask 4 which is shown in the diagram of FIG. 1. A first surface 6 of this part of the mask 4 can be seen from the exterior by any person passing close to the vehicle. For aesthetic reasons, the visual appearance of the mask 4 is, generally, extremely dark, or black. The mask is, therefore, produced from a dark, particularly black, diffusing material. If this mask is not lit, or if the light source is distant, this mask can appear to be opaque.

The second surface 8 of the mask 4, facing away from the first surface towards the inside of the light module and therefore not visible for an external observer of the vehicle, is coated with a coating 10 of a light reflecting material. This coating 10 contributes to the opaque rendering of the mask from outside the vehicle. In particular, this coating can consist of a metal layer.

As can be seen in FIG. 1, the coating 10 does not fully cover the second surface 8, such that a portion of this second surface is produced which is a portion 12 free of coating.

Additional light-emitting means 14, separate from the light-emitting means housed moreover in the light module to carry out lighting and/or signaling functions of high beam, low beam, direction indicator, etc., type, are placed behind the mask 4, hidden from the exterior by this mask, and it is notable that these additional light-emitting means 14 are placed opposite the portion 12 free of coating.

Thus, the reflective coating is apertured to allow the light rays emitted by the additional means to pass through the mask, from the interior of the module towards the exterior, the light rays emitted by the additional light-emitting means and passing through the mask 4 then being visible from the exterior to any person passing close to the vehicle.

According to a preferred embodiment of the invention, the shape of the portion 12 free of coating defines the shape of a visual sign characteristic of the manufacturer of the vehicle. The portion 12 free of coating can therefore, by way of nonlimiting examples, define the shape of a logo or of a badge of the manufacturer of the vehicle, or the shape of an emblem of the model of the vehicle in question.

The portion 12 free of coating can be obtained via several types of method, including a first which consists in a full coating of the second surface of the mask with a layer of reflective material, then in a cutting, for example laser ablation, of this reflective layer on the area that is intended to be free of reflective material. A second type of method can consist in the use of a film arranged on the second surface of the mask before metallization, said film being shaped to allow reflective material to be deposited on some portions of the mask but not on others.

It is understood that the light rays coming from said additional light-emitting means 14 are blocked by the layer of reflective material, with the exception of the rays passing through the mask at the area free of coating, which rays can be seen from outside the vehicle. As a result, when the additional light-emitting means 14 emit light, only the portion of the first surface 6 corresponding to the portion 12 free of coating of the second surface 8 appears to be lit in the eyes of any person passing close to the vehicle, the rest of the first surface 6 retaining, according to a preferred embodiment of the invention, the dark appearance given to the polymer material which makes up the mask 4 via suitable additives. This is illustrated by FIG. 2 which schematically shows the view that an external person, who passes close to the vehicle, has of the first surface 6 of the mask when the additional means are switched on and the portion free of coating has a "V" shape. When the additional light-emitting means 14 are switched off, the first surface 6 of the mask has a dark or opaque uniform appearance, due to the dark diffusing material used for the mask and the presence of a metallized coating behind this dark diffusing material, given that the portion free of coating is only present on a small part of the second surface of the mask and that it is not made out by a person who would pass close to the vehicle.

According to various embodiments of the invention, which are not shown, a colored transparent element (not shown in the figures) can be attached, for example by sticking, to the second surface 8 of the mask, at the portion free of reflective coating. Although this operation adds an assembly and sticking step to the production of the light assembly according to the invention, it makes it possible to enrich the visual possibilities for presenting the chosen characteristic sign.

According to a preferred embodiment of the invention, the portion 12 free of reflective coating is arranged in a region of the mask 4 corresponding to the impact area for some light rays 16 coming from the sun and concentrated on the mask after having been reflected and focused by the focusing means 2, these light rays and the risks of damage brought about thereby being known by lamp manufacturers as the so-called "Sunburn" phenomenon. Thus, this allows the evacuation of these light rays and prevents them from causing the mask to overheat and deteriorate.

According to the invention, the additional light-emitting means 14 are separate from the light-emitting sources intended for the lighting and/or for the signaling of the vehicle, and they are controlled independently of the latter. More precisely, the additional light-emitting means 14 are associated with control means (not shown in the figures) which are independent of those which control the lighting and/or signaling light elements of the vehicle.

Advantageously, moreover, the control means associated with the additional light-emitting means 14 according to the invention are controlled according to a set of predefined parameters when the driver of the vehicle arrives close thereto. This set of predefined parameters allowing, in particular, the presentation of the visual sign characteristic of the manufacturer of the vehicle or of the model of the vehicle then becomes an integral part of a "welcome scenario" for the driver. For example, and in a nonlimiting manner, the additional light-emitting means 14 can be controlled when the driver locks or unlocks one or more doors of the vehicle, wherein the control of said additional light-emitting means 14 can then be continuous or defined over a predetermined duration. It is understood that the light assembly includes means for processing information for detecting the presence of the driver close to the vehicle, and that the means for controlling said additional means act according to a set of predefined parameters when detection information is received.

It emerges from the above description that the invention, via simple, low-cost means which can be used on all types of vehicles, makes it possible to present, within the context of a "welcome scenario" for the driver of a motor vehicle, a visual sign characteristic of the manufacturer or of the model of said vehicle and, thus, allows this vehicle to be customized and distinguished with respect to the competition.

It should be noted that the invention is not limited to the embodiments described in the present document, and that it extends to all equivalent means and to any technically effective combination of such means.

The invention claimed is:

1. A light assembly for the lighting and/or the signaling of a motor vehicle, including at least one light module housing means for emitting light rays in the direction of the output of said module, and a mask, part of which extends below focusing means, wherein said part of said mask which extends under said focusing means has at least a first surface that are seen by any person passing close to the vehicle and at least a second surface opposite said first surface, wherein the mask is made from a dark diffusing material and a reflective material coating is deposited on part of the second surface while leaving a portion of this second surface free of reflective coating, and wherein additional light-emitting means are placed opposite said second surface, such that the light rays emitted by said additional light-emitting means pass through the mask via said portion free of reflective coating.

2. The light assembly according to claim 1, wherein the reflective material coating deposited on the second face of the mask is a metal thin layer.

3. The light assembly according to claim 1, wherein the mask is produced from a polymer material to which are added additives for obtaining a black visual appearance of said mask.

4. The light assembly according to claim 1, wherein a transparent element is attached to the second surface of the mask, at the portion free of reflective coating.

5. The light assembly according to claim 1, wherein said portion free of reflective coating is produced in a region of the mask on which light rays coming from the sun are concentrated after having been reflected and focused by the focusing means of said light module.

6. The light assembly according to claim 1, wherein said additional light-emitting means are separate from said means for emitting and focusing light rays for the lighting and/or the signaling of the vehicle.

7. The light assembly according to claim 1, wherein the light assembly associates with said additional light-emitting means for controlling said additional light-emitting means which are independent of the means for controlling the means for emitting and focusing light rays for the lighting and/or the signaling of the vehicle.

8. The light assembly according to claim 7, wherein the light assembly includes means for detecting the presence of the driver close to the vehicle, said means for controlling said additional light-emitting means acting according to a set of predefined parameters when detection information is received.

9. A method of producing a mask of a light assembly according to claim 1, wherein said portion free of reflective coating is obtained via cutting a reflective material coating previously deposited on the second surface of the mask.

10. The method according to claim 9, wherein said cutting is achieved by laser ablation.

* * * * *